May 14, 1940.  J. B. NEIL ET AL  2,200,242
MACHINE FOR TREATING COTTON PLANTS
Filed March 17, 1939  3 Sheets-Sheet 1
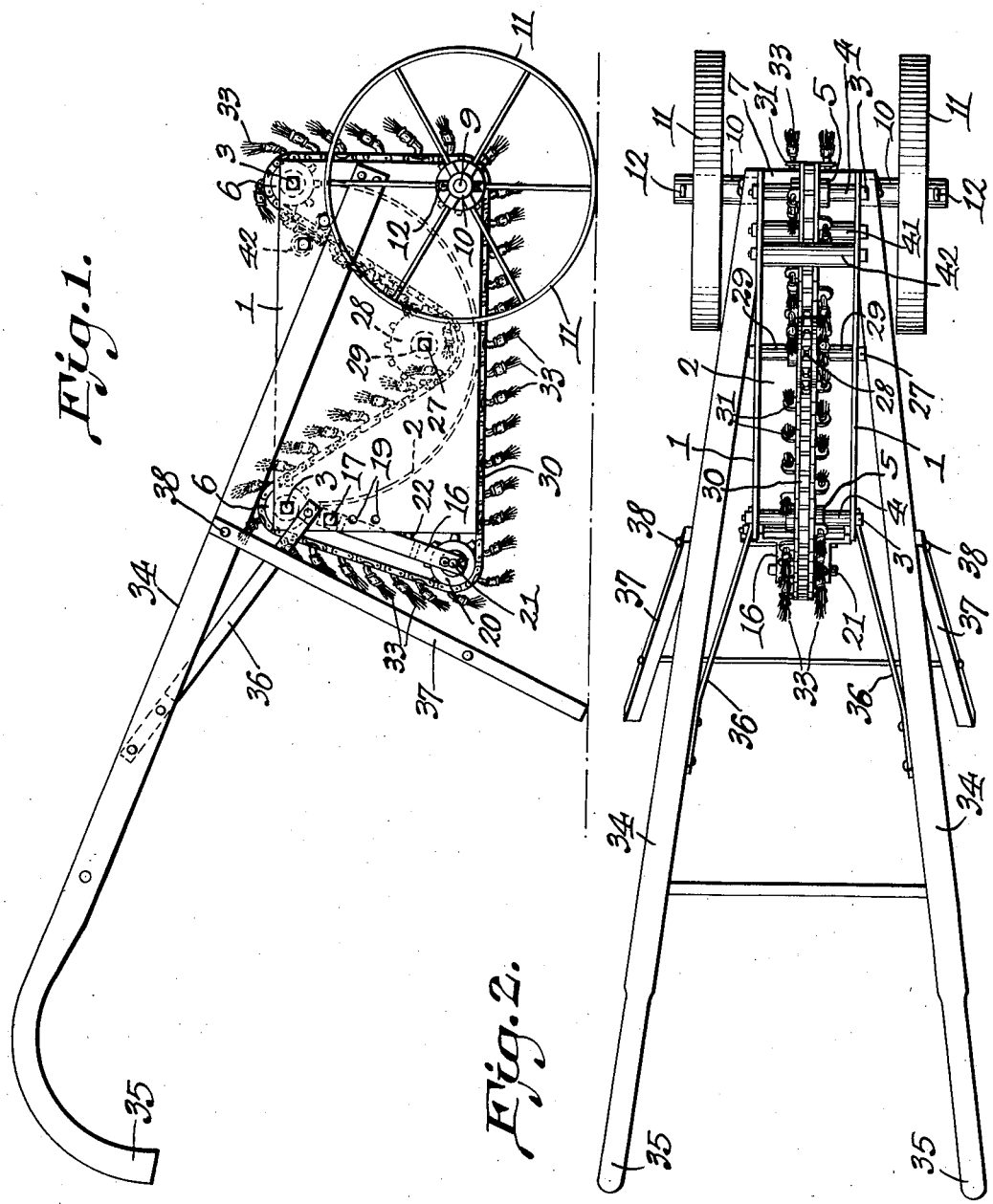
J. B. Neil
T. C. O'Farrell
INVENTORS
BY
ATTORNEYS.

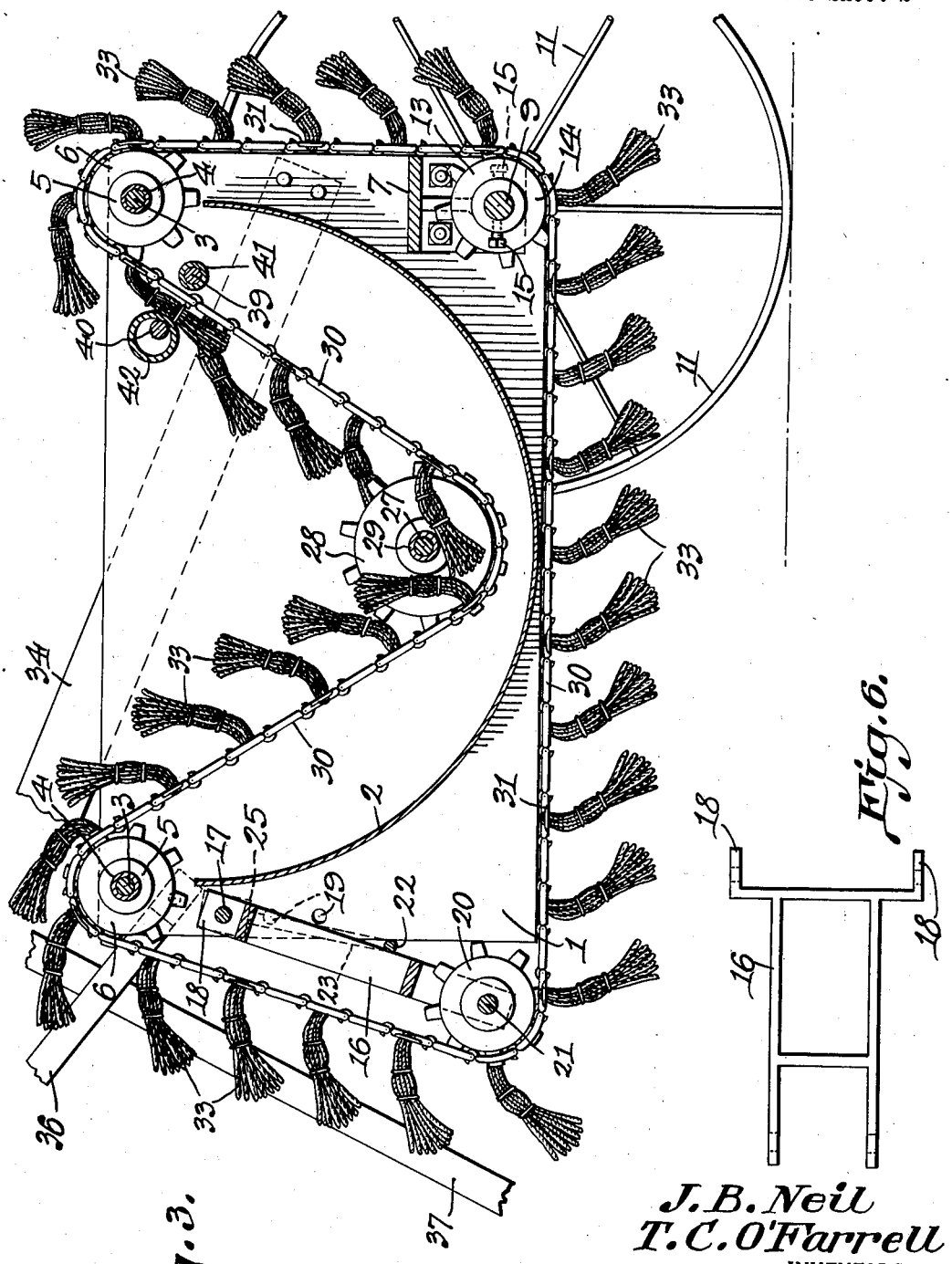

May 14, 1940.   J. B. NEIL ET AL   2,200,242
MACHINE FOR TREATING COTTON PLANTS
Filed March 17, 1939   3 Sheets-Sheet 3
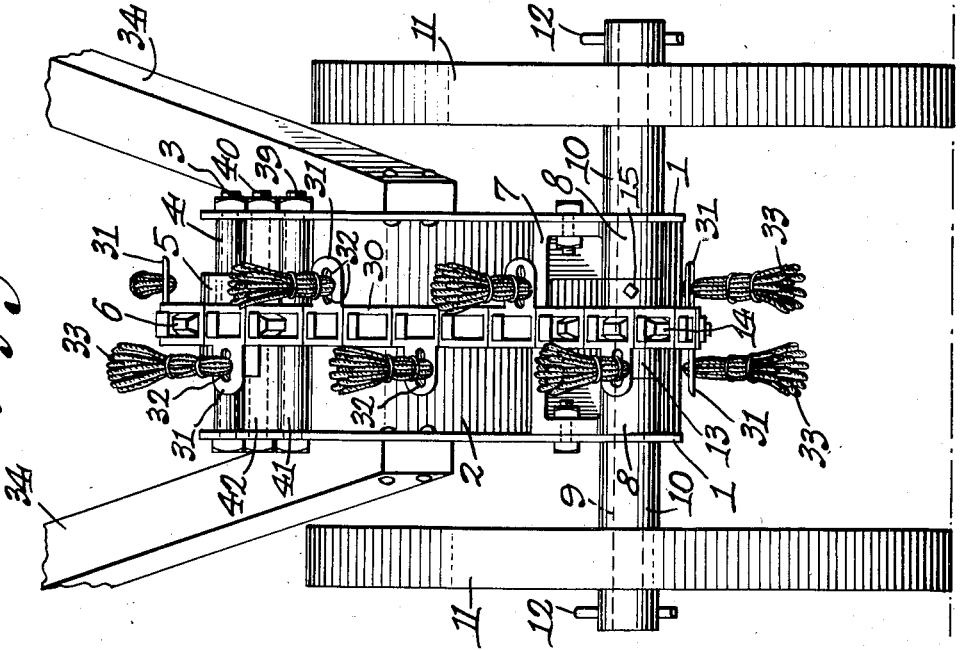
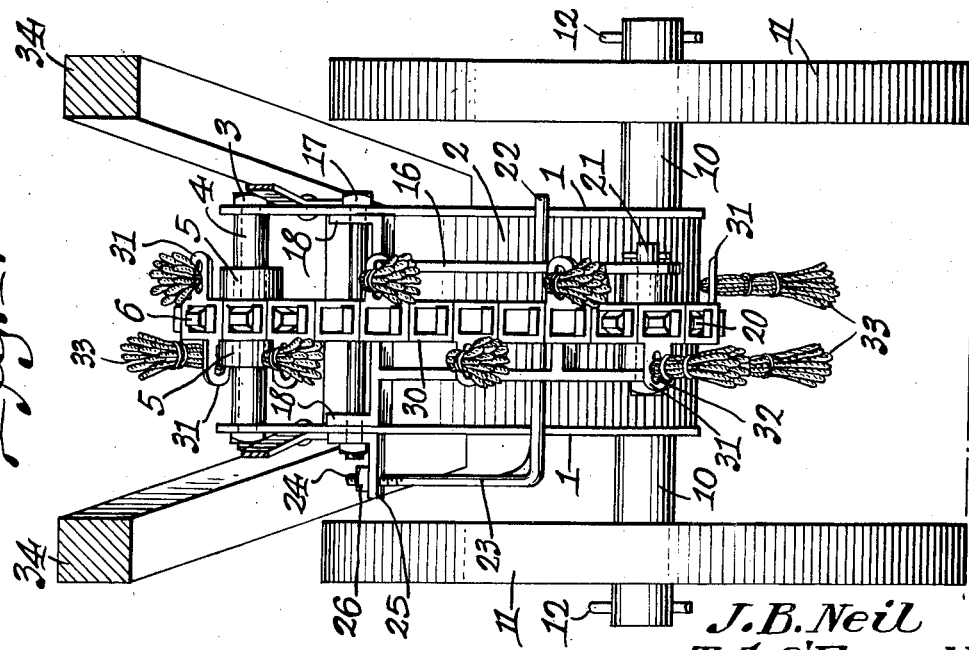
J. B. Neil
T. C. O'Farrell
INVENTORS
BY *C. A. Snow & Co.*
ATTORNEYS.

Patented May 14, 1940

2,200,242

UNITED STATES PATENT OFFICE 2,200,242

MACHINE FOR TREATING COTTON PLANTS

Joseph B. Neil and Thomas C. O'Farrell, York, S. C., assignors of one-third to Thomas M. Ferguson, York, S. C.

Application March 17, 1939, Serial No. 262,496

3 Claims. (Cl. 299—29)

This invention relates to a machine for treating cotton plants while standing in the field, and it is designed primarily for applying to the plants a poison which has the property of killing destructive pests such as the boll weevil.

As is well known to those experienced in cotton growing, the boll weevil emerges from the ground while the cotton plants are still young. They gather on the young and tender plants at the buds on the tips of the plants and remain thereon until the plants flower. Thereafter the female weevils puncture the buds and deposit their eggs therein in order that they may subsequently hatch. Thereafter the weevils die but injury to the buds and squares has already been effected.

The object of the present invention is to subject the young plants to certain treatment whereby the female weevils can be destroyed before the buds are punctured and the eggs deposited, thereby not only destroying the weevils but also preventing the production of subsequent generations of the pests.

Heretofore in the treatment of cotton plants for the purpose of combating the boll weevil, there has been used a mixture of calcium arsenate and low grade molasses. The means thus far employed for this purpose, however, have not been satisfactory because they soon become clogged and they do not properly apply the insecticide to the plants.

An object of the present invention is to provide a simple but efficient apparatus whereby the insecticide can be placed on the plants without danger of clogging the apparatus used and will also be applied to the parts of the plants by wiping them with applicators containing the insecticide, these applicators being of such a nature as not to harm the plants being treated.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a side elevation of the complete machine.

Figure 2 is a top plan view thereof.

Figure 3 is an enlarged central vertical section through the tank and adjacent parts.

Figure 4 is a rear elevation, the handle being shown in section.

Figure 5 is a front elevation.

Figure 6 is a detail view of the supporting frame of the chain tightener.

Referring to the figures by characters of reference, 1 designates side plates of any suitable size and interposed between and connected to these plates is an arcuate plate 2 which cooperates with the plates 1 to form a tank having a substantially semi-cylindrical cavity. The upper corners of the plates 1 are joined by transverse bolts 3 on which are mounted spacing sleeves 4 having collars 5, a pair of these collars being located adjacent to the center of each sleeve. Journalled between the collars of each pair is a sprocket 6.

A cross brace 7 is secured between the forward lower corner portions of the plates 1 and support bearing sleeves 8 in which is journalled an axle 9 which extends transversely through the side plates 1 and has its ends seated in the hubs 10 of supporting wheels 11. These hubs are held to the axle by cotter-pins 12 or the like. To the middle portion of axle 9 is secured the hub 13 of a sprocket 14, this sprocket being attached to the axle in any suitable manner, as by means of set screws 15.

Supported between the side plates 1 at the back thereof and adjacent to sprocket 6 is a tightener frame 16 this frame being held in position by a transverse bolt 17. The bolt is extended through laterally offset ears 18 carried by the frame and as shown particularly in Figure 4, these ears being fitted snugly against the inner sides of the plates 1 and the bolt 17 being insertible into any one of a series of apertures 19 provided in the plate. As the bolt is removable, it will be obvious that the frame 16 of the tightener can be raised or lowered between the plates.

A sprocket 20 is journalled on a rod 21 carried by the lower end of frame 16 and interposed between frame 16 and the back edges of the plates 1 is an adjusting rod 22 having an upwardly extending arm 23 which is screw-threaded at its end as shown at 24. This screw-threaded portion is supported within a bracket 25 extending laterally from one of the plates 1 and, by means of a nut 26 engaging the threaded end of the arm, said arm can be adjusted upwardly so as to cause the rod 22 to act as a wedge between frame 16 and the back edges of plate 1. Consequently frame 16 can thus be adjusted angularly and held at a predetermined angle against swinging movement forwardly relative to the plates 1.

A transverse rod 27 is secured within the side plates 1 so as to be supported above the center of plate 2 and mounted for free rotation on this rod is a sprocket 28 held spaced from the side plates 1 by sleeves 29.

An endless belt made up of chain links 30 is mounted on the several sprockets. These sprockets are so located that the lower portion of the chain belt will extend under but close to the plate 2 and along lines substantially parallel with but between the lower edges of the side plates 1. The front portion of the chain belt is extended upwardly over sprocket 6 from sprocket 14 and this chain belt is then extended downwardly within the receptacle formed by plates 1 and 2 so as to extend under the freely rotating sprocket 28. From this sprocket the belt extends upwardly over the rear sprocket 6 thence downwardly under sprocket 20.

Certain of the links of the belt are provided with ears 31 extending laterally therefrom. Some of the links have ears extending to the left of the belt while other links have ears extended to the right. The ears are so positioned as to be regularly spaced, each ear being extended oppositely to the center of the space between the next adjoining ears on the opposite side of the belt. In other words the ears are disposed in staggered relation.

Each of the ears is provided with one or more apertures 32 whereby applicators formed preferably of woolen yarn and which have been indicated at 33, can be attached to the respective ears. These applicators are so connected as to hang downwardly from the lower flight of the chain belt while moving beneath the container formed by plates 1 and 2.

To facilitate manipulation of this machine, handle bars are secured to the outer sides of the plates 1 and are extended upwardly and rearwardly as indicated at 34, these bars terminating in grips 35 and being suitably reenforced, as by means of braces 36 connected to the rear portions of the side plates. Transversely braced legs 37 are connected to the bars 34 as indicated at 38 and cooperate with the wheels 11 to support the container when not in use.

In using the apparatus it is intended to employ an insecticide made up of calcium arsenate and a low grade molasses in equal amounts by volume. These ingredients, after being thoroughly mixed, are poured into the container and the apparatus is then ready for use. The wheels 11 are positioned at opposite sides of a row of small cotton plants and as the apparatus is pushed along the row the endless chain belt will work within the container and the links of this belt, together with the tufts moving downwardly and then upwardly within the contents of the container will act to thoroughly agitate the contents and at the same time saturate the tufts constituting the applicators. As these applicators move upwardly adjacent to the forward end of the top of the container, they are drawn between spaced rods 39 and 40. Rod 39 is provided with a rotatable sleeve 41 while rod 40 has loosely mounted on it a tube 42 extending from one side to the other of the container and the internal diameter of this tube is much greater than the diameter of the rod 40 on which it is mounted. Thus as the applicators are drawn upwardly between the rods, as shown for example in Figure 3, the tube 42 will operate as a freely moving expressing element by means of which excessive liquid can be pressed from the applicators as they pass successively from the container.

The applicators, saturated with sticky insecticide, are moved downwardly at the front of the apparatus and thence rearwardly under the bottom of the container. During this rearward movement they will wipe the adjacent portions of the plant so as to leave deposits of the insecticide adhering to the treated portions.

It has been found that when the insecticide is applied as herein described while the plants are still young and before the insects have laid their eggs, destruction of the cotton squares has been practically eliminated.

By utilizing soft applicators made up of wool yarn or the like, plants will not be injured but will be gently wiped during the application of the insecticide.

Obviously this machine can be made of any size and might be constructed to simultaneously treat plants in two or more rows.

As the applicators are suspended from oppositely extending ears on the endless chain belt, they will apply insecticide not only to the tops but also to opposite side portions of the plants when the machine is properly guided along the row. As the applicators drag along the plants they will tend to invert the leaves and apply the insecticide to the bottom surfaces thereof.

By adjusting the frame 16 the endless chain belt can be tightened as necessary.

What is claimed is:

1. Apparatus for treating young cotton plants which includes a wheel supported container proportioned to straddle and move along a row of young plants, said container constituting a means for holding a sticky insecticide, an endless belt, a driving connection between the supporting wheels and the belt, substantially parallel rows of applicators of absorbent material carried by and positioned to hang downwardly from the belt while passing under the container, means for guiding the belt downwardly into the container, and means for guiding the belt and depending applicators for movement along a straight line beneath and in the direction of movement of the container for simultaneous wiping engagement with a plurality of plants at substantially the same level.

2. Apparatus for treating young cotton plants which includes a wheel supported container proportioned to straddle and move along a row of young plants, said container constituting a means for holding a sticky insecticide, an endless belt, a driving connection between the supporting wheels and the belt, means for guiding the belt downwardly into the container and rearwardly beneath the container, substantially parallel rows of applicators of absorbent material carried by and positioned to hang downwardly from the belt while passing under the container, and means within the container for removing surplus insecticide from the applicators successively prior to leaving the container, said means comprising spaced transverse rods and a tubular roll mounted for eccentric free rotation upon one of the rods and constituting a rolling weight.

3. The combination with a container for holding an insecticide, and supporting wheels for the container, said apparatus being proportioned to straddle and move along a row of plants, of an endless belt, means operated by the wheels for driving the belt during the movement of the apparatus along the straddled row, said belt comprising connected links having laterally extended ears in staggered relation, tufts of absorbent material suspended from the ears and disposed in substantially parallel rows, said tufts being mounted for successive wiping contact with plants straddled by the apparatus, and a means for guiding the belt downwardly and upwardly within the container to agitate the contents thereof and rearwardly beneath the container to position the applicators for contact with the plants.

JOSEPH B. NEIL.
THOMAS C. O'FARRELL.